Oct. 4, 1949.  J. ROSENBLUM  2,483,937
OIL VAPORIZER
Filed April 6, 1945  3 Sheets-Sheet 1
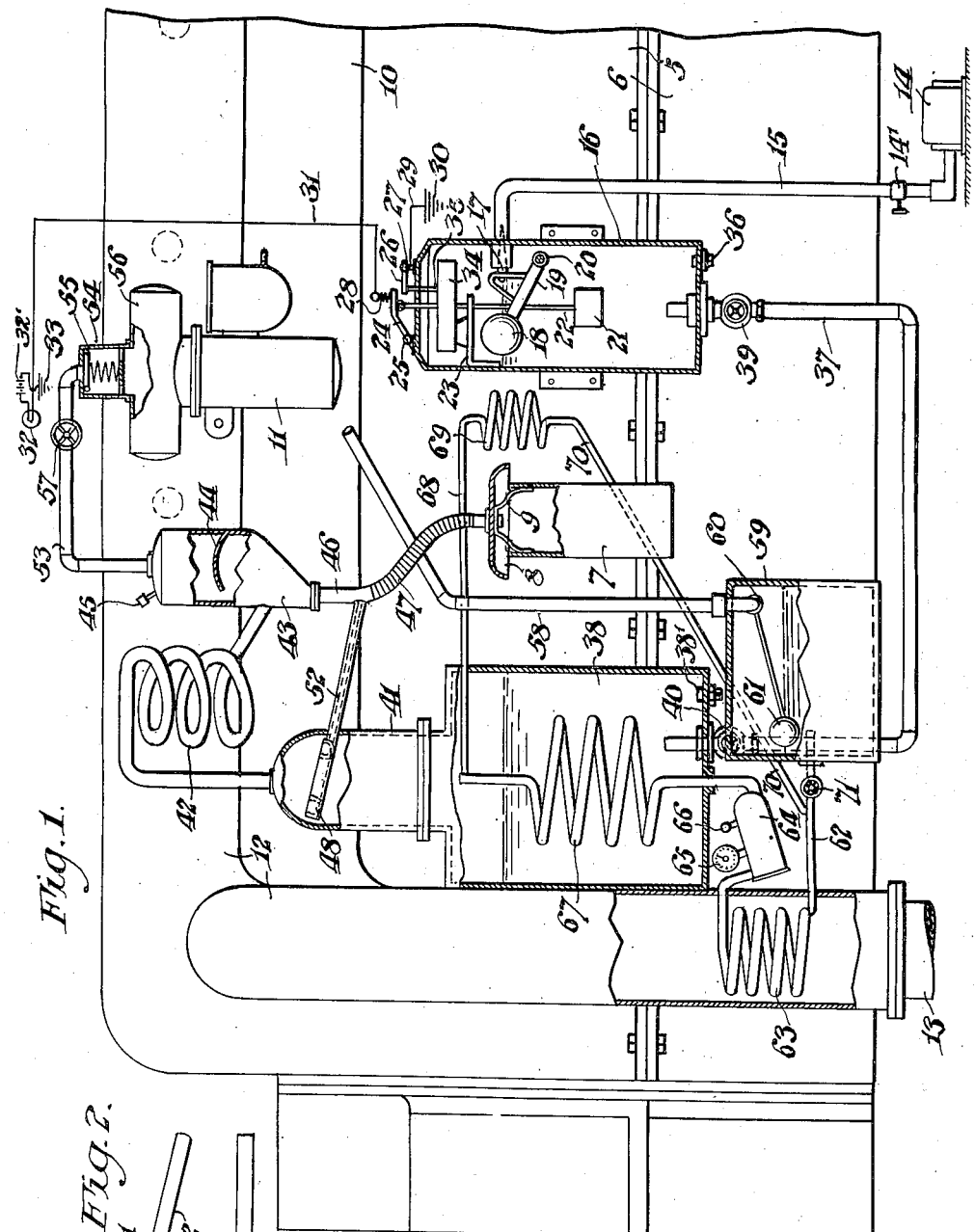
Inventor:
Jacob Rosenblum,
By W. W. Williamson
Attorney.

Oct. 4, 1949.                J. ROSENBLUM                2,483,937
                              OIL VAPORIZER
Filed April 6, 1945                                3 Sheets-Sheet 2

Inventor.
Jacob Rosenblum,
By W. W. Williamson
Attorney.

Oct. 4, 1949.   J. ROSENBLUM   2,483,937
OIL VAPORIZER

Filed April 6, 1945   3 Sheets-Sheet 3

Inventor:
Jacob Rosenblum,
By W. W. Williamson
Attorney.

Patented Oct. 4, 1949

2,483,937

UNITED STATES PATENT OFFICE 2,483,937

OIL VAPORIZER

Jacob Rosenblum, Crescent Park, N. J., assignor of one-fourth to Henry Trattner, Audubon, and one-fourth to Raymond L. Siris, Camden, N. J.

Application April 6, 1945, Serial No. 586,919

6 Claims. (Cl. 123—196)

My invention relates to new and useful oil vaporizers especially adapted for use in connection with internal combustion engines and particularly employed as accessories or permanent parts of the engines of automotive vehicles, and any other engine that is lubricated by oil and generates heat directly or indirectly.

An object of this invention is to constantly refine and purify the oil used in an engine, by means of heating, boiling and vaporizing the oil, collecting and separating the foreign solids therefrom, and at the same time reclaiming the unused fuel and moisture accumulating in the engine crankcase, which are harmful when contained in the oil, by separating and removing said fuel and moisture from the oil, in the form of vapors, and thereafter using said fuel and moisture, formerly discarded and wasted, for the efficient operation of the engine.

Another object of the invention is to provide a circulating system for the oil from the engine crankcase, which system includes a vaporizing or boiling vessel and a supply control tank so positioned relative to each other that the proper liquid level is maintained in the vaporizing vessel.

Another object of this invention is to connect a signal with the supply control tank and provide means in the latter to actuate said signal when the supply reaches a preselected high or low level in said supply control tank or said tank and the vaporizing vessel.

Another object of the invention is to provide means for separating the different elements of the used oil and a number of lines of return for the refined oil and a passage for the separated fuel and moisture leading to the fuel supply system.

Another object of the invention is to provide means for directly heating the vaporizing vessel from the exhaust manifold or component thereof, of an engine.

A further object of the invention is to provide means for heating the vaporizing vessel with steam produced by heating water flowing through a coil in the exhaust manifold of an engine.

A still further object of the present invention is to provide for heating the vaporizing vessel by heat supplied from burning fuel in a heating chamber associated with said vaporizing vessel.

With the above and other objects in view this invention consists of the details of construction and combination of elements hereinafter set forth and then designated by the claims.

In order that those skilled in the art to which this invention appertains may understand how to make and use the same I will describe its construction in detail referring by numerals to the accompanying drawings forming a part hereof, in which:

Fig. 1 is a side elevation of a portion of an internal combustion engine with the elements of the oil vaporizer of the steam heated type connected thereto and portions shown as broken away and in section to illustrate details of construction.

Fig. 2 is a perspective view of the oil intercepting and return ring and connecting tube or stem. Fig. 2a is a sectional elevation.

Figure 3:
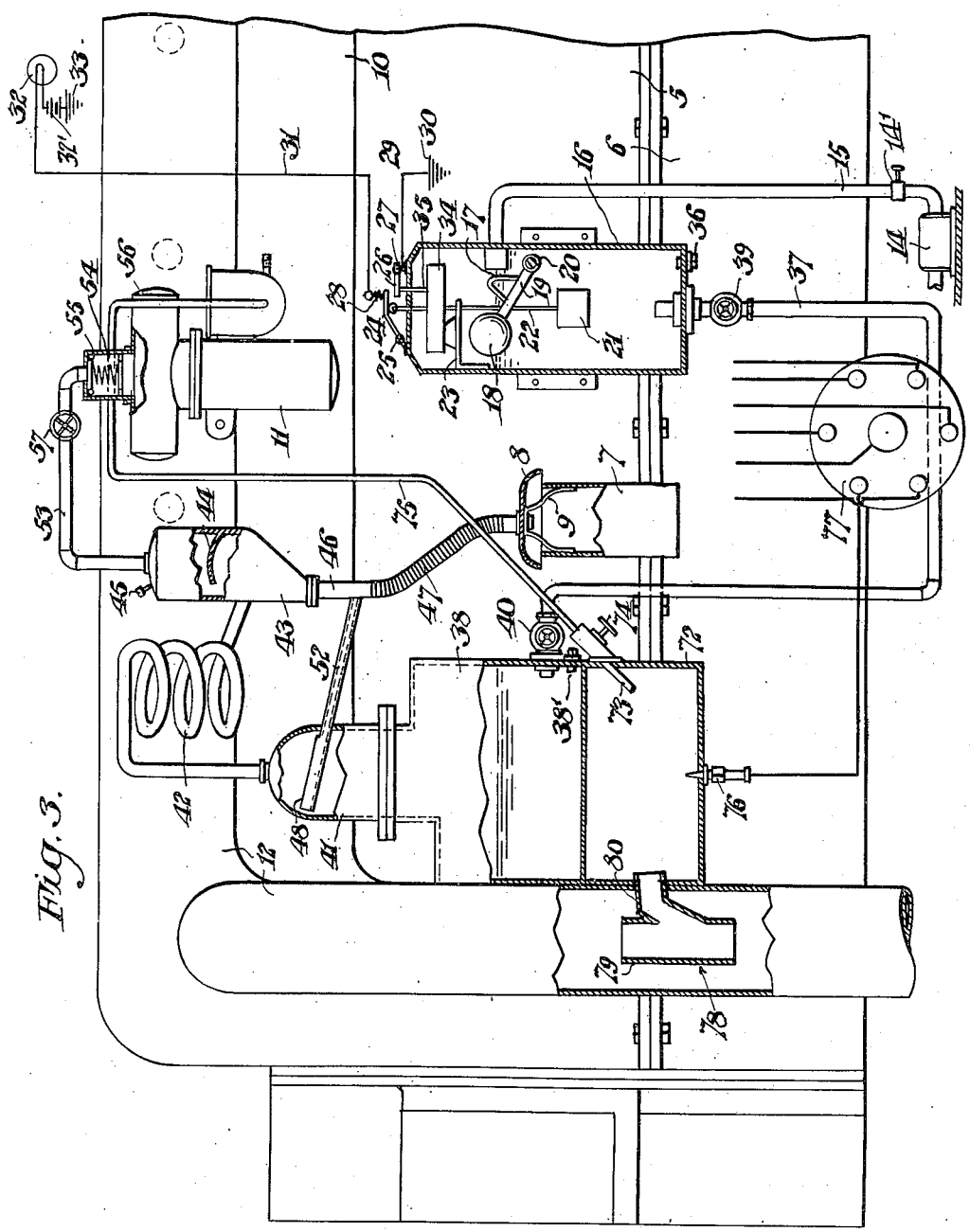
Fig. 3 is a side elevation of a portion of an engine with the elements of the oil vaporizer of the fuel heated type connected thereto and portions shown as broken away and in section to illustrate details of construction, and the electrical systems depicted diagrammatically.

In carrying out the invention as herein embodied, 5 denotes an internal combustion engine having a crankcase 6 to which leads an oil filler tube 7 covered by the usual breather cap 8, removably held in place by a spring clip 9 or equivalent or substitute means. An intake manifold 10 supplys fuel to the engine cylinders from a carburetor 11, and an exhaust manifold 12 leads from the exhaust side of the engine to an exhaust pipe 13 connected with the muffler (not shown) all in the usual manner.

An oil pump 14, which generally is a part of engine installations, is shown for delivering oil from a crankcase 6 through a pipe 15 to the upper part of an oil supply control tank 16. A valve 14' is interposed in pipe 15 to shut off the system if and when necessary. The liquid flowing through or from said pipe 15 is regulated by a valve 17 preferably located in the outlet end of said pipe or at the inlet to the tank and said valve may be urged towards its open position by a spring and towards its closed or both positions by a float 18 mounted on an arm 19 pivoted at 20 within the supply control tank 16.

Also within the supply control tank 16 is a low level float 21 having a stem 22 that projects through a bracket 23 and the top of the tank and is pivotally connected to a swinging contact blade 24, suitably pivoted at 25 and insulated from the tank or other metal part to which it may be secured. The contact blade 24 is adapted to engage a second contact blade 26, pivoted at 27 and also grounded to its support by pigtails and forming part of one side of an electric circuit, it being understood that the first named contact blade forms a part of the other side of the circuit.

For convenience of illustration the second contact blade 26 is shown as having a wire 29 connected to ground 30, and the contact blade 24 has a flexible connection or pigtail 28 attached to the wire 31 which latter is connected to one side of a signal device 32, such as a lamp, while the other side of said signal device is connected to a source of electricity 32' and thence to ground 33.

The second contact blade 26 will be operated, under certain conditions, by the high level float 34 which rests on the bracket 23, when said high level float is in its neutral position, and may slide on the float stem 22 independently thereof, through the medium of the rod 35 carried by said high level float 34, which rod also projects through the top of the supply control tank for cooperation with said second contact blade 26.

Assuming that the elements are functioning properly, the pump will force oil through the pipe 15 to the supply control tank 16 and when the preselected liquid level has ben reached the float 18 will close the valve 17 and as the oil in the supply control tank decreases the float will descend and open the valve 17 so that under ordinary conditions a constant oil level will be maintained.

Should the oil supply to the supply control tank fail for any reason, and the oil level drop below the preselected level a considerable extent the low level float 21 will descend and pull down the contact blade 24 until it engages the second contact blade 26 to close the circuit through the signal device 32, thus giving a warning to the operator that something is wrong.

If the valve fails to close or some other condition causes the supply control tank 16 to fill or the oil to rise above the preselected level, the high level float 34 will ascend and move the second contact blade 26 into engagement with the contact blade 24 and likewise close the circuit through the signal device as a warning to the operator.

The supply control tank 16 is provided with a drain plug 36 to permit said tank to be drained for cleaning purposes and the removal of any accumulations of sediment precipitated from the oil while in the tank.

From the supply control tank leads an outlet pipe 37 to the vaporizing vessel 38, and said outlet pipe has its ends detachably connected to both containers with a valve 39, 40 adjacent each container so that either valve may be closed to prevent the oil in the pipe from escaping when an end of said pipe is disconnected at either end thereof. The ends of the pipe project above the bottoms of their respective containers to prevent precipitated sediment from reentering the pipe. A drain plug 36' is provided in the vaporizing vessel for cleaning purposes.

The vaporizing vessel 38 has a reduced upper end or dome 41 from which leads a condensing coil 42 to a separator tank 43 having a baffle 44 therein. This baffle is above the location of the point of connection of the condensing coil with the separator tank 43 to assist in directing the oil downward while permitting any fuel and water vapors or moisture, which are of a lighter specific gravity, to rise to the upper end of the separator tank. This tank is provided with a safety blow-off valve 45 that is set to blow off at a safe predetermined pressure to prevent the accumulation of such excess internal pressure as might cause an explosion.

An outlet nipple 46 is connected with the lower end of the separator tank 43 and from said nipple leads a flexible tube 47 which is attached to the cap 8 and therefore communicates with the oil filler tube 7 when the cap is in place. An oil intercepting and return ring 48, Figs. 2 and 2a, comprises an annular body 49 forming a central opening 50 and said body is provided with a channel 51 open at the top. A hollow stem 52 is fixed to the ring body at a point on its outer circumference and communicates with the bottom of the channel. The ring 48 is located in the upper portion of the vaporizing vessel 38, particularly the dome 41 thereof, in an inclined position with its stem projecting through a wall of the vaporizing vessel and fixed to the nipple 46 for communication with the latter.

A pipe 53 runs from the top of the separator tank 43 to a safety valve 54 including a spring actuated flap 55 and said valve 54 is connected to an air cleaner 56 of any well known or preferred construction, which cleaner is attached to the carburetor 11. A shut off valve 57 is interposed in the pipe 53.

Referring now to Fig. 1 of the drawing, a pipe 58 leads from the cooling system of the engine, such as the radiator (not shown), or other source of water supply, to a reservoir 59 where a desired head of water is maintained by a valve 60 controlled by a float 61 in the reservoir.

An outlet pipe 62 leads from the reservoir 59 to the inlet end of a heating coil 63 located in a suitable portion of the exhaust manifold 12, or a component part thereof. The outlet end of the heating coil 63 is connected to the steam fitting 64 outside of the exhaust and said steam fitting is provided with a suitable gauge and stop valve 65 which prevents water flowing through until the steam pressure reaches a predetermined point, and a safety blow-off valve 66. A heat transfer coil 67 is located inside of the vaporizing vessel 38 and has its inlet end projected through a wall of said vessel and connected to the steam fitting 64 while the outlet end of said heat transfer coil is connected to a pipe 68 that passes throgh a wall of the vaporizing vessel and is connected with the inlet end of a condensing coil 69. The outlet end of the condensing coil is connected to a pipe 70 which leads back to the reservoir outlet pipe 62. A shut-off valve 71 is interposed in said outlet pipe 62 ahead of the point where the pipe 70 connects to said pipe 62 or between the location of the connection of said pipes and the reservoir 59. It is to be understood that the coil 63 can be in a housing to be connected in the exhaust as will be described in that form of the invention shown in Fig. 4, and all pipes or other parts passing through walls will be properly packed or sealed to prevent leakage around them.

The water level in the reservoir 59 must be at a sufficient height to properly feed the heating coil 63 and as the water passes into said heating coil the temperature of said water will be raised to a high degree by the exhaust gases flowing about the heating coil. The water will be changed to steam and caused to pass through the steam fitting 64 thence to and through the heat transfer coil 67. The heating of the coil 67 will cause the oil and other liquids in the vaporizing vessel 38 to vaporize and enter the dome 41 and thereafter pursue the courses to be later described.

The steam or condensate will flow from the coil 67 through the pipe 68 to the coil 69 where it will be condensed and from that location the water will flow through the pipe 70 back to the pipe 62 for subsequent circulation.

As shown in Fig. 3, the vaporizing vessel 38 is provided with a heating cylinder 72, either separate therefrom or as an integral part thereof, and into the fire chamber of said heating cylinder projects a nozzle 73 controlled by a valve 74. This nozzle is fed with fuel from the carburetor 11 of the engine, or from some other suitable source of supply, through the pipe or tube 75 having one end connected to the carburetor and the other end to the nozzle. The fuel entering the fire chamber of the heating cylinder 72 is ignited in some desirable manner, as by a spark plug 76 mounted in the heating cylinder and electrically connected to the ignition system of the engine, for example, the distributor 77. Said fuel also may be ignited by vacuum created in heating cylinder 72, by reason of the hot exhaust gas and flame passing through elements 78 and 79. Valve 74 is constructed with a safety screen to prevent flame or combustion products from backing up into the fuel supply.

As the fuel is burned, the products of combustion are drawn off through a draft induction device 78 mounted in the exhaust manifold or a component part thereof, said draft induction device comprising a body 79 mounted in the exhaust longitudinally thereof and having a bore straight through it for the passage of some of the exhaust products from the engine, and an elbow 80 projecting into the fire chamber of the heating cylinder 72. The heat generated in the heating cylinder will raise the temperature of the contents of the vaporizing vessel as and for the purpose previously mentioned.

Figure 4:
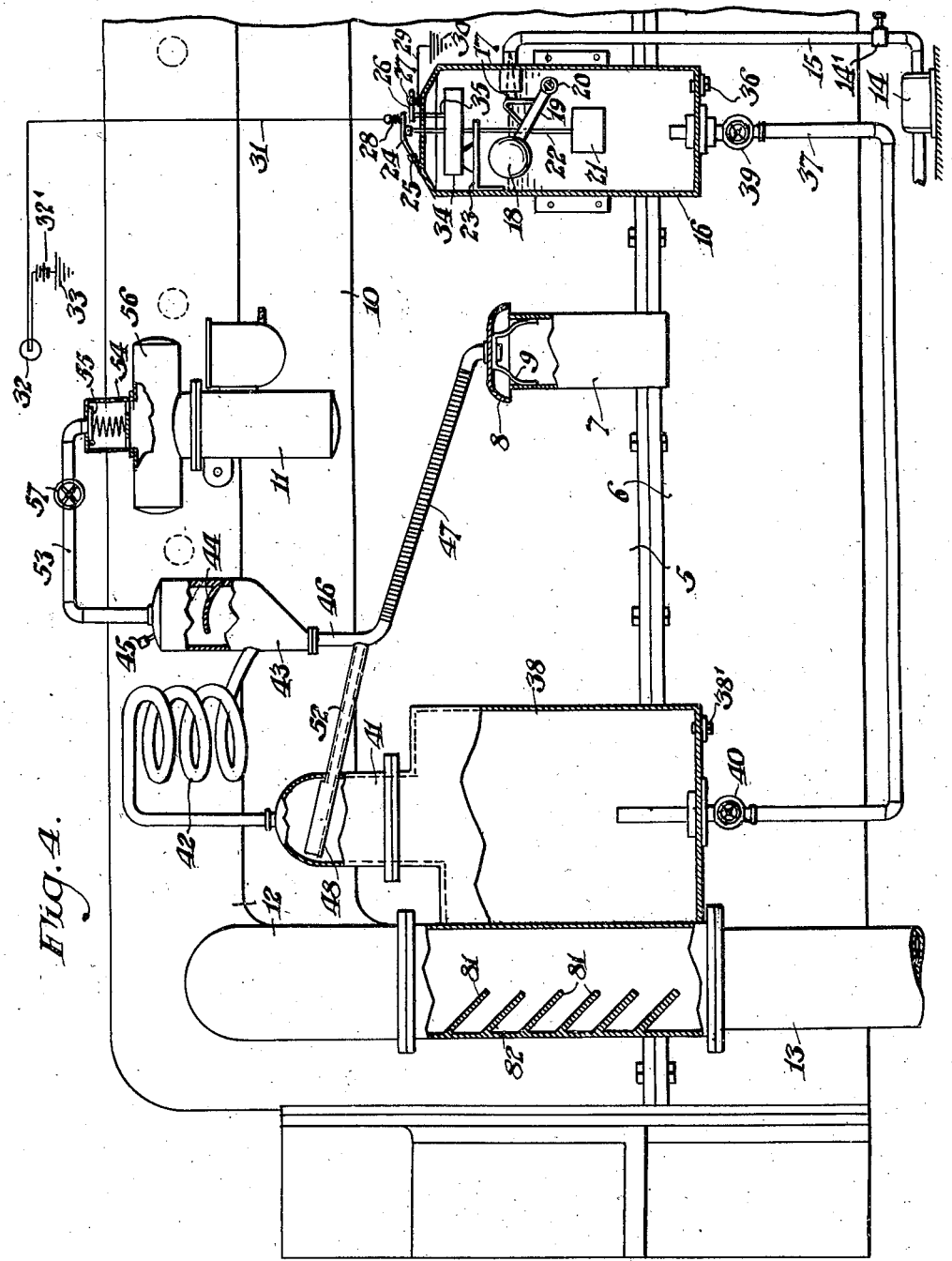
Fig. 4 is a similar view of the oil vaporizer of the direct exhaust heated type.

In Fig. 4 the exhaust manifold, or a component part thereof, has a series of inclinded baffles 81 to deflect the hot products of combustion towards a side of the vaporizing vessel 38 for heating the contents of the latter. An efficient means for accomplishing this is to provide a housing 82 as a unitary part of the vaporizing vessel so that there will be a single wall only between the chambers of said vaporizing vessel and housing to allow the ready transfer of heat from the housing to the vaporizing vessel. In such an instance the baffles 81 are in the housing. With a structure of this character it is only necessary to fit the housing in a proper position between parts of the exhaust manifold and the vaporizing vessel will be installed or assembled at the same time.

It is to be particularly noted that the supply control tank 16 and the vaporizing vessel are so positioned vertically that the desired oil level in the vaporizing vessel will be maintained or controlled by the oil level in the supply control tank since oil is fed by gravity from said supply control tank to the vaporizing vessel.

In practice, the contents of the vaporizing vessel are heated directly or indirectly by the products of combustion or gases exhausted from the engine, or through the use of a separate heating system using some part or parts of the engine. When the contents of said vaporizing vessel are heated to a sufficiently high temperature said contents will be vaporized and rise to the dome 41 where the vapors will pass through and around the ring 48. Some of the vapor, especially oil vapor, will be condensed within the dome and enter the ring channel to flow through the stem 52 to the fitting 46, thence through the flexible tube 47 and the filler tube 7 to the crankcase, as a clean unadulterated product.

At the same time some of the vapor will pass through the condensing coil to further cool it before entering the separator tank 43. Here the oil, which is heavier than the gaseous fuel and water vapors, will descend to the bottom of the separator tank and flow through the fitting 46, the flexible tube 47 and the filler tube 7 to the crankcase.

As the oil and fuel and water vapors are separated the said fuel and water vapors will rise and be drawn through the pipe 53, past the safety valve 54 and through the cleaner 56 to the carburetor 11 to be fed through the intake manifold to the engine for addition to the operating fuel.

Of course I do not wish to be limited to the exact details of construction as herein shown and described as these may be varied within the scope of the appended claims without departing from the spirit of my invention.

Having described my invention what I claim as new and useful is:

1. An oil vaporizer comprising, in combination with an engine including intake and exhaust manifolds, a crankcase, an oil filler tube leading to said crankcase and a carburetor; a vaporizing vessel located contiguous the exhaust manifold to be heated by the latter for refining oil, a supply control tank, means to provide a communication between said tank and vessel whereby oil may be fed by gravity from the tank to the vessel and said tank being so located relative to the vessel that the liquid levels in both will be in the same horizontal planes, means in the supply control tank to regulate the liquid level, means to supply oil from the crankcase to the supply control tank, an oil intercepting ring in the vessel, and means to deliver refined oil from the intercepting ring to the oil filler tube for return to the crankcase.

2. The oil vaporizer of claim 1 wherein the oil intercepting ring and means to deliver refined oil from the vaporizing vessel to the oil filler tube comprises a channel ring within the vessel, a hollow stem projecting from said ring and in communication with the channel, said ring and stem being inclined to cause oil to flow around the channel and down the stem, a flexible tube with which the stem is in communication, and a breather cap to which the flexible tube is connected, said breather cap removably mounted on the oil filler tube.

3. In an oil vaporizer, a vessel in which oil and other fluids mixed therewith are to be vaporized and solids collected, said vessel having an inlet at the bottom thereof and an outlet at the top of the same, an oil intercepting and return ring located in the upper part of the vessel and having a channel open at the top, and a hollow stem projecting from said ring and extending through a side wall of the vessel.

4. The structure of claim 3 wherein the upper part of the vessel in which the ring is located, is restricted in diameter to provide a dome.

5. An oil vaporizer for refining engine oil comprising, in combination with an engine having an oil circulating system, a vaporizing vessel and means for heating the same, means for delivering contaminated oil to said vessel to be vaporized, means to intercept some of the oil refined by the vaporization thereof, a separator tank, means to deliver the balance of the oil and other volatile substances to said separator tank where said balance of the oil will descend and the other substances will ascend, means to deliver the oil in the separator tank and that which was intercepted to the starting point of the oil circulating system, and means to deliver said other substances to the fuel intake of the engine.

6. An oil vaporizer comprising in combination with an engine capable of generating heat, a source of oil supply, a vaporizing vessel to be heated by the engine heat for refining oil, a supply control tank, means to provide a communication between said tank and vessel whereby oil may be fed from the tank to the vessel, means in the supply control tank to regulate the liquid level, means to supply oil from the source of supply to said supply control tank, a channeled ring within the vaporizing vessel, a hollow stem projecting from said ring and through a side wall of said vaporizing vessel and in communication with the channel, said ring and stem being inclined to cause oil to flow around the channel and down the stem, and a flexible tube forming a communication between the lower end of said stem and the source of supply.

JACOB ROSENBLUM.

REFERENCES CITED

The following references are of record in the file of this patent:

UNITED STATES PATENTS

| Number | Name | Date |
| --- | --- | --- |
| 994,389 | Hans | June 6, 1911 |
| 1,559,215 | Woolson | Oct. 27, 1925 |
| 1,624,957 | Lilley | Apr. 19, 1927 |
| 1,628,085 | Wall | May 10, 1927 |
| 1,705,041 | Aseltine | Mar. 12, 1929 |
| 1,725,392 | Clifford | Aug. 20, 1929 |